US012225990B2

(12) United States Patent
Loacker

(10) Patent No.: US 12,225,990 B2
(45) Date of Patent: Feb. 18, 2025

(54) TELESCOPING AND/OR FOLDING POLE

(71) Applicant: ALPIN LOACKER GmbH, Koblach (AT)

(72) Inventor: Felix Loacker, Klaus (AT)

(73) Assignee: ALPIN LOACKER GmbH, Koblach (AT)

( * ) Notice: Subject to any disclaimer, the term of this patent is extended or adjusted under 35 U.S.C. 154(b) by 155 days.

(21) Appl. No.: 18/128,425

(22) Filed: Mar. 30, 2023

(65) Prior Publication Data

US 2024/0324739 A1    Oct. 3, 2024

(51) Int. Cl.
*A45B 9/00* (2006.01)
*F16B 7/04* (2006.01)

(52) U.S. Cl.
CPC ............... *A45B 9/00* (2013.01); *F16B 7/042* (2013.01); *A45B 2009/007* (2013.01); *Y10T 403/7088* (2015.01)

(58) Field of Classification Search
CPC ............. A45B 2009/007; F16B 7/042; F16B 2200/69; Y10T 403/7088; Y10T 403/598; Y10T 403/599
See application file for complete search history.

(56) References Cited

U.S. PATENT DOCUMENTS

| | | | |
|---|---|---|---|
| 4,528,998 A | 7/1985 | Gamm | |
| 5,083,883 A * | 1/1992 | Ueda | B25G 3/26 403/379.5 |
| 5,255,993 A | 10/1993 | Kovacs | |
| 8,641,314 B2 * | 2/2014 | Thacker | F16B 7/00 403/109.8 |
| 2019/0208874 A1 * | 7/2019 | Ritter | A45B 9/02 |
| 2020/0179776 A1 | 6/2020 | Roiser | |

FOREIGN PATENT DOCUMENTS

| | | | |
|---|---|---|---|
| CN | 109276000 A * | 1/2019 | A45B 9/00 |
| DE | 2055553 | 5/1972 | |
| EP | 0338178 | 10/1989 | |
| EP | 2586505 | 5/2013 | |
| EP | 3666349 | 6/2020 | |

OTHER PUBLICATIONS https://www.amazon.de/dp/B08W2D8DZ9/?tag:glv-21&ascsubtag:25e6c49a-1115-4534-9868-dde516b2f8ef&th=1&psc=1&linkCode=osi&maas=&ref=aa maas; Downloaded May 25, 2023. Available Oct. 22, 2021.

* cited by examiner

*Primary Examiner* — David R Dunn
*Assistant Examiner* — Danielle Jackson
(74) *Attorney, Agent, or Firm* — Volpe Koenig

(57) ABSTRACT

Telescoping and/or folding pole, in particular for hiking, having a first tubular portion (1) and a second tubular portion (2). The first tubular portion (1) is arranged partially inside the second tubular portion (2) and can be axially displaced therein, the first tubular portion (1) has a radial opening (3) and a radially movable and resiliently loaded securing element (4) which extends through the radial opening (3) and on which the second tubular portion (2) is positioned such that an axial pushing-together of the first tubular portion (1) and the second tubular portion (2) is impeded is provided. The securing element (4) has a recess (5) with which the second tubular portion (2) cooperates such that radial movements of the securing element (4) relative to the second tubular portion (2) are prevented.

10 Claims, 5 Drawing Sheets

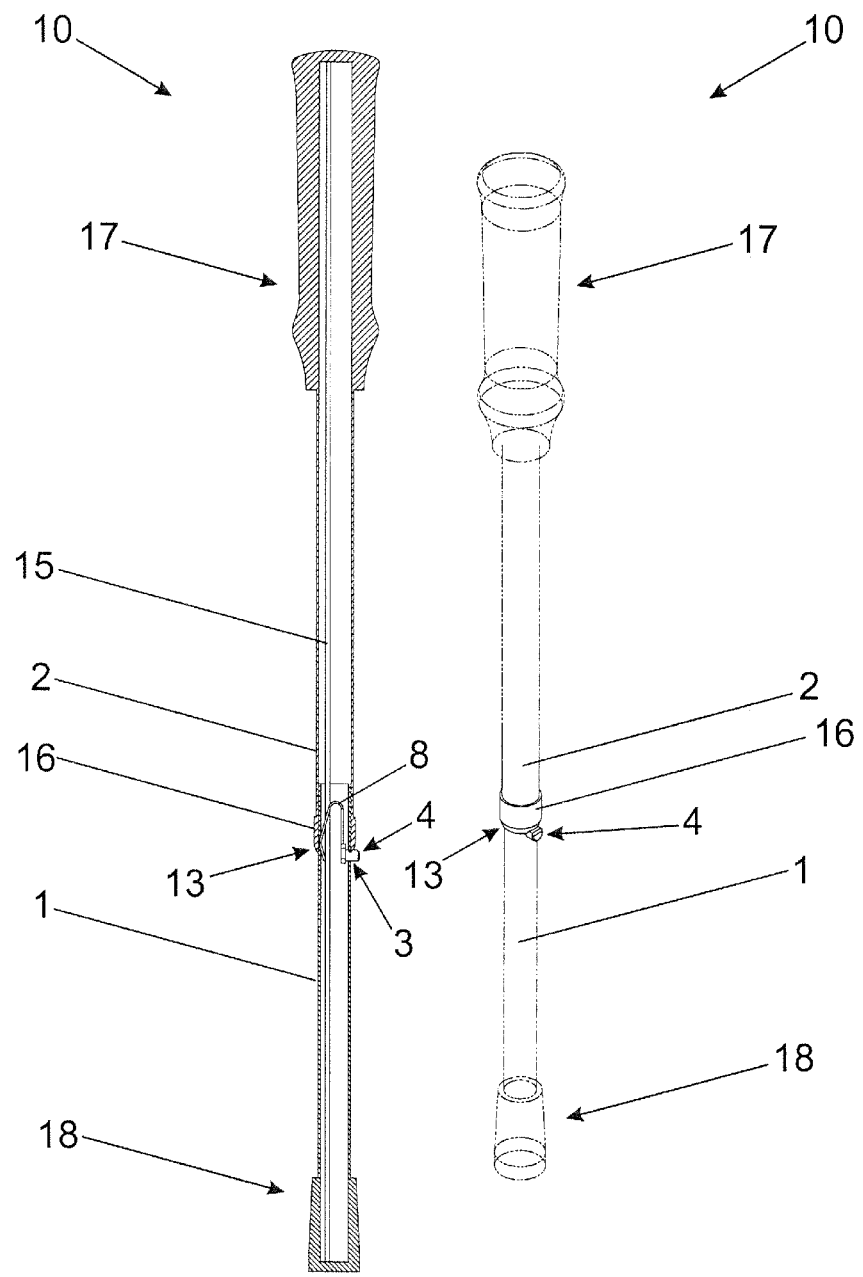

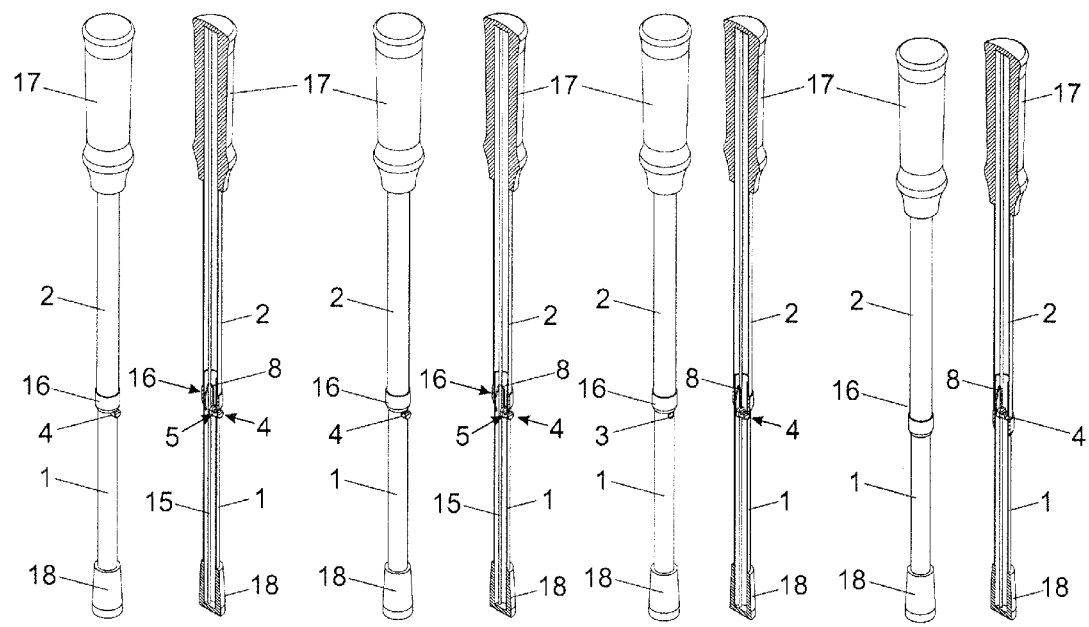

Fig. 6A    Fig. 7A    Fig. 8A    Fig. 9A    Fig. 10A
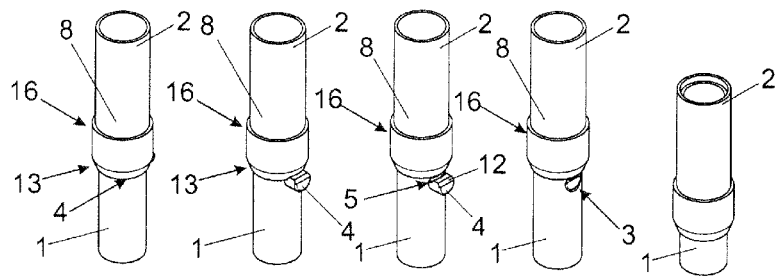
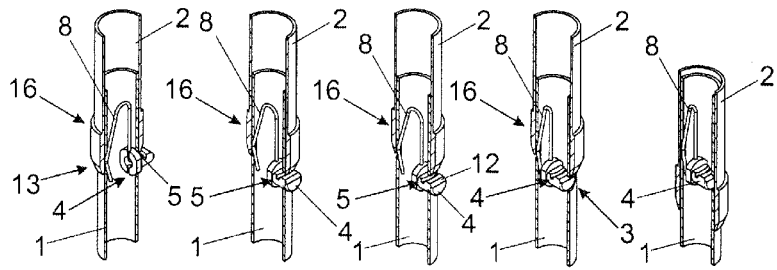
Fig. 6B    Fig. 7B    Fig. 8B    Fig. 9B    Fig. 10B Fig. 11A  Fig. 11B  Fig. 11C  Fig. 11D  Fig. 11E
Fig. 12
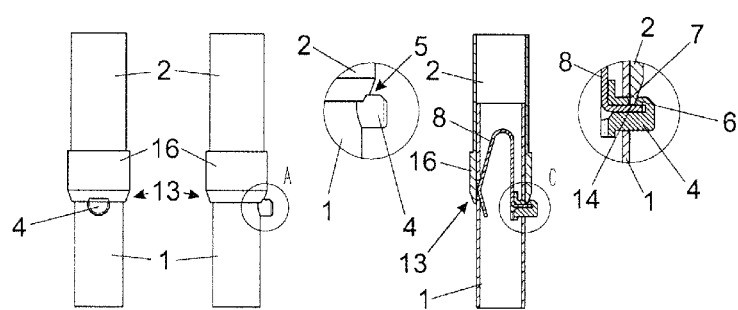
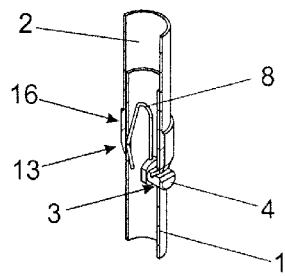
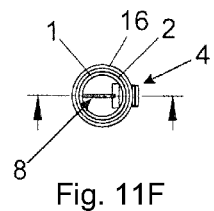
Fig. 11F

TELESCOPING AND/OR FOLDING POLE

TECHNICAL FIELD

The present invention relates to a telescoping and/or folding pole, for example, for hiking.

BACKGROUND

Telescoping and/or folding poles according to the prior art have a first tubular portion and a second tubular portion, wherein the first tubular portion is arranged partially inside the second tubular portion and can be axially displaced therein,] the first tubular portion has a radial opening and a radially movable and resiliently loaded securing element which extends through the radial opening and on which the second tubular portion is positioned in such a manner that an axial pushing-together of the first tubular portion and the second tubular portion is impeded is provided.

In this regard, reference may be made to FIG. 1C of EP 2586505 A1 which discloses such an embodiment as prior art.

Other embodiments of telescoping and/or folding poles appear in the mentioned document and in EP 3666349 A1, US 2019/0208874 A1 and EP 0338178 A1.

The astonishing complexity of the telescoping poles proposed in these documents is notable.

Since such complex embodiments are almost inevitably linked with increased susceptibility to failure, technically simple embodiments are naturally preferable. In this instance, however, there are also disadvantages.

This is because, in spite of the resilient action of the securing element, it may be the case in practice that the securing element is introduced inward through the radial opening in an undesirable manner, for example, since an obstacle has just been struck with the securing element or since, as a result of striking an obstacle, such large jerks or vibrations are produced in the telescoping and/or folding pole that the resilient pretensioning is thus overcome in an undesirable manner. The telescoping pole may then immediately or when next placed on the ground be pushed together in a similarly undesirable manner, which may not only be unpleasant but also obviously represents a health risk for the user.

SUMMARY

An object of the present invention is therefore to provide a telescoping and/or folding pole which both with regard to use and also with regard to the susceptibility to failure is more reliable than in the prior art.

This object is achieved with a telescoping and/or folding pole having one or more of the features described herein, that is to say, by the securing element having a recess with which the second tubular portion cooperates in such a manner that radial movements of the securing element relative to the second tubular portion are prevented. The pushing-together of the first tubular portion with the second tubular portion remains impeded thereby and the above-mentioned risks do not occur or are at least reduced.

The cooperation of the recess in the securing element with the second tubular portion could in some embodiments also be referred to as engagement of the second tubular portion in the recess.

It should be mentioned that according to the invention not quite all radial movements of the securing element must be prevented. For example, it is thus possible for a degree of play to be present between the recess and the second tubular portion. In the context of the invention, however, it is necessary as a result of the cooperation of the second tubular portion with the recess for at least some movements which may lead to undesirable pushing-together of the telescoping and/or folding pole to be prevented.

As a result of intentional, for example, manual overcoming of the resilient loading, however, the securing element may be pressed into the radial opening (uncoupling of the securing element) and the pushing-together of the first tubular portion with the second tubular portion can thereby be released. Depending on the embodiment, the first tubular portion can then be introduced partially or completely in the second tubular portion.

Since the technical structure of the telescoping and/or folding pole according to the invention is relatively simple, other technical errors and defects also become less probable. Furthermore, the simple technical structure results in a weight advantage which is naturally particularly desirable in the case of walking aids and sports articles.

In preferred embodiments, the recess, in particular the groove, retains the second tubular portion in play-free manner under the action of the resilient loading.

Telescoping poles according to the invention may, for example, be used for hiking or Nordic walking, but also for ski tours, cross-country skiing, skiing or the like.

The first tubular portion and/or the second tubular portion may preferably have a hollow-cylindrical tube, wherein in a particularly preferred manner there is a circular-ring-like cross section. Naturally, other basic forms for the tubular portions are also in principle conceivable (for example, oval, rectangular or generally polygonal).

The radial and the axial directions to which reference is made here naturally relate to the mentioned hollow-cylindrical basic shape of the first tubular portion and the second tubular portion. That is to say, the term "axial" relates to the notional center axis, along which the first tubular portion and the second tubular portion are moved in a telescoping manner and the term "radially" refers to directions perpendicular to this center plane.

In a particularly preferred manner, there may be provision for the first tubular portion to fit in a precisely fitting manner in the second tubular portion. Naturally, a gap dimension will generally be provided so that the first tubular portion can slide in the second tubular portion.

The radial opening may, for example, be in the form of a hole.

The resilient loading may preferably act in a radially outward direction.

Other preferred embodiments are defined below and in the claims.

There may preferably be provision for the recess to have a face which is directed radially inward and which prevents the securing element from being pressed in, preferably with the resilient loading being overcome, as long as the securing element cooperates with the recess. Accidental pressing-in of the securing element, for example, as a result of an undesirable collision, is thus effectively prevented.

As a result of a selective axial movement of the second tubular portion relative to the first tubular portion (extension), however, the securing element can be moved out of engagement. The securing element can then also be pressed in and the second tubular portion can be moved in a telescoping manner into the first tubular portion.

The securing element may preferably be resiliently loaded in a radially outward direction and the recess may have a radially outwardly directed face which, as a result of the resilient loading of the securing element, applies a radial securing force to the second tubular portion.

That is to say, for example, a resilient element which produces the resilient loading of the securing element presses the securing element in such embodiments constantly against the second tubular portion and transmits the securing force thereto. As a result of the radial securing force, a degree of non-positive-locking connection is produced between the securing element and the second tubular portion. Jerks or vibrations which occur as a result of collisions with objects then lead, but only with much less probability, to the securing element being retracted through the radial opening and thus undesirably releasing the pushing-together of the first tubular portion and the second tubular portion. At the same time any possible play between the tubular portions and/or the securing element is less perceptible.

It should be noted that there are also embodiments, wherein the securing force acts at least partially in an inward direction and is transmitted from the radially inwardly directed face. To this end, only the resilient element has to be accordingly adapted. However, embodiments are preferred, wherein the securing element is resilient loaded exclusively in a radially outward direction.

It should be noted that the radially outwardly directed face and/or the radially inwardly directed face do not have to be completely parallel with respect to the axial direction. Specific inclinations may certainly be provided without losing the technical advantage of such embodiments. This applies particularly when the second tubular portion tapers and thereby extends at a substantial angle into the recess.

In the context of the invention, radially inwardly or outwardly directed faces may have an angle with respect to the center axis of the first tubular portion and/or the second tubular portion which does not exceed 60°, preferably 40° and in a particularly preferred manner 20°, where 0° would be a face which is completely parallel with the center axis.

The securing element may be resiliently loaded by means of a resilient element, which is supported on an inner face, which is arranged opposite the radial opening, of the first tubular portion.

Preferably, the resilient element may be in the form of a yoke spring. Other embodiments with helical and/or leaf springs are naturally in principle conceivable.

The recess may be in the form of a groove, wherein a groove base of the groove impedes the axial pushing-together of the first tubular portion and the second tubular portion. Groove flanks may then act as the radially outwardly directed face and/or the radially inwardly directed face.

The recess—in particular the groove—may have a bend, which bend substantially corresponds to a curvature of the second tubular portion—that is to say, for example, with the exception of production tolerances and the like. That is to say, the recess and/or the groove does not extend along a linear axis, but instead along a curved axis, which is adapted to the curvature of the second tubular portion. For example, when the second tubular portion is constructed in a circular-cylindrical manner, the recess would accordingly extend along a circular-curved axis. A precise fit of the second tubular portion in the recess can thereby be achieved.

The securing element may have a cylindrical basic shape, wherein a chamfer which is directed in the direction of the second tubular portion is preferably provided. The cylindrical basic shape may be based on a circular cross section, wherein other cross sections are also absolutely conceivable (oval, rectangular or generally polygonal).

Furthermore, for example, a rounded head may be provided on the securing element.

The chamfer which is directed in the direction of the second tubular portion may be advantageous since the second tubular portion when pulling out the telescoping or folding pole according to the invention can thereby be moved more easily over the securing element.

The securing element may further have guide faces, which guide the securing element in the radial opening of the first tubular portion in such a manner that rotations of the securing element are prevented and the chamfer always remains orientated in the desired direction.

The second tubular portion may taper in the direction toward the securing element and may preferably engage in the recess with an end face which adjoins the tapered portion. In embodiments with a groove as a recess, the end face may contact the groove base.

As a result of such a tapered portion, the end face and consequently the recess can be kept relatively small.

The second tubular portion may have a sleeve which is mounted at the end of the tubular portion, at which the first tubular portion is introduced into the second tubular portion. The tapered portion mentioned may be arranged on this sleeve.

The sleeve may be produced from a plastics material.

The first tubular portion and/or the (remaining) second tubular portion may comprise a metal material.

An inner cable connection may exist between the first tubular portion and the second tubular portion so that a complete pushing-apart of the first tubular portion and the second tubular portion is impeded. In other words, the cable connection prevents the first tubular portion from being released from the second tubular portion. Advantageously, it is natural with the cable connection that no or only little resistance against the pushing-together of the first tubular portion and the second tubular portion occurs.

Beyond the first tubular portion and the second tubular portion, additional tubular portions may be provided. These may also be configured in a telescoping manner so that, for example, the third tubular portion moves inside the first tubular portion in a telescoping manner.

Optionally or additionally, there may be provision for the third tubular portion (and optionally other tubular portions) to be placed, for example, on the first tubular portion and to be fixed relative to the first tubular portion by means of a cable connection when the securing element is in engagement with the second tubular portion. By moving the first tubular portion in a telescoping manner into the second tubular portion, the cable connection can be loosened to such an extent that the third tubular portion (and where applicable the additional tubular portions) can be removed from the first tubular portion and, for example, folded. A folding pole is referred to in this instance.

If only telescoping tubular portions are provided, a telescoping pole is referred to. Naturally, mixed forms are also conceivable.

The cable connection can be produced from steel, that is to say, a steel cord or a steel cable can be used.

A steel cord may be preferred since it enables a degree of resilience without the telescoping and/or folding pole being able to be pulled apart too easily.

Naturally, other apparatuses which prevent a release of the first tubular portion from the second tubular portion can also be used, for example, a stop or the like.

BRIEF DESCRIPTION OF THE DRAWINGS

Other advantages and details of the invention will be appreciated from the Figures and the associated description of the Figures, in which:

FIGS. 1A and 1B show an embodiment of a telescoping and/or folding pole according to the invention, FIGS. 2A, 2B, 3A, 3B, 4A, 4B, 5A, 5B show various illustrations of the embodiment of FIGS. 1A and 1B for moving the telescoping and/or folding pole in a telescoping manner, FIGS. 6A, 6B, 7A, 7B, 8A, 8B, 9A, 9B, 10A, 10B show detailed illustrations for moving the telescoping and/or folding pole according to the embodiment of FIGS. 1a and 1b in a telescoping manner, FIGS. 11A to 11F show various views of the embodiment from FIGS. 1a and 1b in the region of the securing element, FIG. 12 shows a perspective view of the embodiment from FIGS. 1a and 1b in the region of the securing element.

DETAILED DESCRIPTION

Figure 13A:
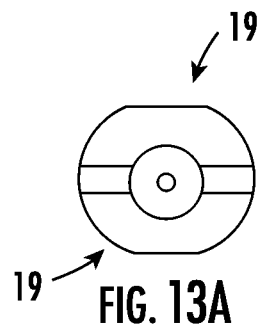
FIGS. 13A to 13I show the securing element as various perspective views and sectioned views.
Figure 13B:
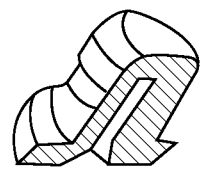
Figure 13C:
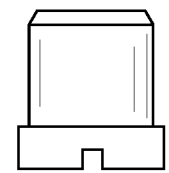

FIG. 1a shows a sectioned illustration of an embodiment of a telescoping and/or folding pole 10 according to the invention and FIG. 1B shows a perspective view thereof.

In this embodiment, the telescoping and/or folding pole 10 is intended to be used, for example, as a walking pole and has a handle 17 and a base 18 for this purpose.

The telescoping and/or folding pole 10 contains a first tubular portion 1 and a second tubular portion 2, wherein the first tubular portion 1 is arranged along a specific length in a precisely fitting manner in the second tubular portion 2.

The outer diameter of the first tubular portion 1 corresponds to this end with the exception of a gap dimension to the inner diameter of the second tubular portion 2 so that the first tubular portion 1 can be axially displaced in the second tubular portion when the securing element 4 does not prevent this.

The securing element 4 extends through a radial opening 3 and is resiliently loaded in a radially outward direction by means of a resilient element 8 in the form of a yoke spring.

The second tubular portion 2 is positioned on the portion of the securing element 4 which projects beyond the first tubular portion 1. A pushing-together of the first tubular portion 1 with the second tubular portion 2 is thereby prevented.

Between the first tubular portion 1 and the second tubular portion 2 there is further a cable connection 15 so that an additional pushing-out of the first tubular portion 1 from the second tubular portion 2 is possible only to a limited extent.

The telescoping and/or folding pole 10 thereby has a substantially fixed length and can, as mentioned, be used as a walking pole or the like. In order to reduce the length of the telescoping and/or folding pole 10 so that it can, for example, be stored, the securing element 4 can be uncoupled and the first tubular portion 1 can be pushed into the second tubular portion 2, which will be described below.

To this end, the embodiment is illustrated in four phases of the uncoupling of the securing element 4.

FIGS. 2A and 2B show the embodiment in the still-coupled state of the securing element 4 as a perspective illustration and a sectioned illustration. FIGS. 7A and 7B each show a cut-out from FIGS. 2A and 2B in the region of the securing element 4. FIGS. 6A and 6B show the same subject-matter as FIGS. 7A and 7B from a slightly different perspective.

FIGS. 3A and 3B show the first step for uncoupling the securing element 4 as a perspective illustration and a sectioned illustration. FIGS. 8A and 8B each show a cut-out from FIGS. 3A and 3B in the region of the securing element 4. In this first step, the first tubular portion 1 and the second tubular portion 2 are pulled slightly apart so that the second tubular portion 2 moves out of the recess 5 in the securing element 4. With respect to the recess 5 and the engagement of the second tubular portion 2, reference may be made to FIGS. 11A to 11F.

The securing element 4 can now be pressed counter to the action of the resilient element 8 into the first tubular portion 1. This is shown in FIGS. 4A and 4B as a perspective illustration and a sectioned illustration. FIGS. 9a and 9b show in each case a cut-out from FIGS. 4A and 4B in the region of the securing element 4. A chamfer 12 which is directed in the direction of the second tubular portion 2 on the securing element 4 facilitates this for the user.

It should be mentioned that the radial opening 3—in this embodiment a hole—can be clearly seen in FIG. 9A.

The actual telescoping action is now possible, that is to say, by the first tubular portion 1 being pushed into the second tubular portion 2. This is shown in FIGS. 5A and 5B as a perspective illustration and a sectioned illustration. FIGS. 10A and 10B each show a cut-out-out from FIGS. 4A and 4B in the region of the securing element 4.

As can be seen in FIG. 10B, the resilient element 8 further loads the securing element 4 so that the securing element 4 again automatically extends through the radial opening 3 as soon as the first tubular portion 1 has been pulled to a sufficient extent out of the second tubular portion 2 again. The telescoping and/or folding pole 10 can thereby automatically be moved again into the starting state illustrated in FIGS. 1A and 1B.

In the telescoped state, which is illustrated, for example, in FIG. 10B, the rail opening 3 further retains the securing element 4 and the resilient element 8 in the correct axial position.

As already mentioned, the first tubular element 1 may be adjoined, for example, by a third tubular element which is connected by means of the cable connection 15 or in a telescoping manner to the first tubular element 1.

In FIGS. 11A to 11F, the embodiment is in various views in the region of the securing element 4. In the drawings:

FIGS. 11A and 11B show lateral illustrations, FIG. 11C shows the detail A from FIG. 11B, FIG. 11D shows a sectioned illustration (see the plane drawn in FIG. 11F), FIG. 11E shows the detail C from FIG. 11D and FIG. 11F shows a horizontal section.

It can be seen that the sleeve 16 of the second tubular portion 2 engages in the recess 5 of the securing element 4. In this embodiment, the recess 5 is in the form of a groove.

The groove has a groove base 11, a radially inwardly directed face 6 as a groove flank and a radially outwardly directed face 7 as another groove flank. In this regard, reference may also be made to FIGS. 13a to 13I.

An end face 14 of the sleeve 16 of the second tubular portion 2 is positioned on the groove base 11 and prevents the first tubular portion 1 from being pushed together with the second tubular portion 2.

The radially inwardly directed face 6 prevents the securing element 4 from being pressed in with the resilient loading being overcome as long as the securing element 4 engages in the groove.

As a result of the resilient loading of the securing element 4, the radially outwardly directed face 7 applies a radial securing force to the portion of the second tubular portion 2 which engages in the groove (in this instance, a portion of the sleeve 16).

FIGS. 13A to 13I show the securing element 4 as different perspective views and sectioned views.

Figure 13D:
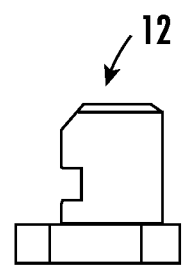
Figure 13E:
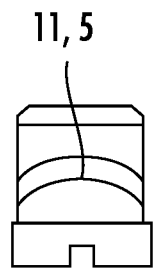
Figure 13F:
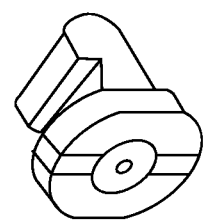

Particularly FIG. 13E clearly shows that the recess 5 has a bend. This bend is configured in such a manner that the second tubular portion 2 can engage precisely in the recess 5, although the second tubular portion 2 is itself curved (cf. FIG. 11E).

Particularly FIG. 13D shows the mentioned chamfer 12 which simplifies the pressing-in of the securing element 4 when the first tubular portion 1 and the second tubular portion 2 has to be retained in the slightly pulled-apart position which is shown in FIGS. 3A, 3B, 8A and 8B.

Figure 13G:
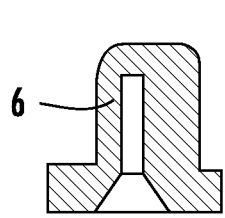
Figure 13H:
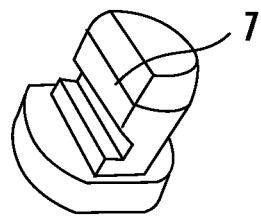
Figure 13I:
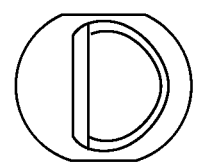

Particularly FIGS. 13g and 13H show that the radially inwardly directed face 6 and the radially outwardly directed face 7 are not completely parallel with the center axis of the first tubular portion 1 and the second tubular portion 2. This facilitates simple and rapid engagement and extraction of the second tubular portion 2 into or from the recess 5.

Particularly FIG. 13D shows that the securing element 4 has guide faces 19 which guide the securing element 4 in the radial opening 3 of the first tubular portion 1 in such a manner that rotations of the securing element are prevented and the chamfer 12 always remains orientated in the desired direction.

In addition to the embodiment shown in this instance, other embodiments are of course possible. For example, the second tubular portion 2 could be configured without a sleeve 16 and thus engage directly in the recess 5.

In place of yoke springs, for example, conical springs or other springs which are adapted to the inner geometry of the first tubular portion could also be used.

Additional radial openings could also be provided in the second tubular portion 2, wherein the securing element extends through overlapping radial openings. The recess could then, for example, be dual-sided or circumferential. In this manner, a telescoping and/or folding pole according to the invention which can be adjusted in terms of length could be produced. The securing element 4 would then not only inhibit pushing together but also pulling apart the first tubular portion 1 and the second tubular portion 2.

LIST OF REFERENCE NUMERALS

1. First tubular portion
2. Second tubular portion
3. Radial opening
4. Securing element
5. Recess
6. Radially inwardly directed face
7. Radially outwardly directed face
8. Resilient element
9. Inner face
10. Telescoping and/or folding pole
11. Groove base
12. Chamfer
13. Tapered portion
14. End face
15. Cable connection
16. Sleeve
17. Handle
18. Base
19. Guide faces

The invention claimed is:

1. A telescoping and/or folding pole, comprising:
    a first tubular portion and a second tubular portion;
        the first tubular portion is arranged partially inside the second tubular portion and axially displaceable therein;
        the first tubular portion has a radial opening;
        a radially movable and resiliently loaded securing element extends through the radial opening and the second tubular portion is positioned on the securing element such that an axial pushing-together of the first tubular portion and the second tubular portion is impeded; and
    the securing element has a recess with which the second tubular portion cooperates such that radial movements of the securing element relative to the second tubular portion are prevented.

2. The telescoping and/or folding pole as claimed in claim 1, wherein the recess has a face which is directed radially inward and which prevents the securing element from being pressed in as long as the securing element cooperates with the recess.

3. The telescoping and/or folding pole as claimed in claim 1, wherein the securing element is resiliently loaded in a radially outward direction and the recess has a radially outwardly directed face which, as a result of the resilient loading of the securing element, applies a radial securing force to the second tubular portion.

4. The telescoping and/or folding pole as claimed in claim 3, wherein the securing element is resiliently loaded by a resilient element which is supported on an inner face, which is arranged opposite the radial opening, of the first tubular portion.

5. The telescoping and/or folding pole as claimed in claim 4, wherein the resilient element comprises a yoke spring.

6. The telescoping and/or folding pole as claimed in claim 1, wherein the recess comprises a groove, and a groove base of the groove impedes the axial pushing-together of the first tubular portion and the second tubular portion.

7. The telescoping and/or folding pole as claimed in claim 1, wherein the recess has a bend that, substantially corresponds to a curvature of the second tubular portion.

8. The telescoping and/or folding pole as claimed in claim 1, wherein the securing element has a cylindrical basic shape, and includes a chamfer directed in a direction of the second tubular portion.

9. The telescoping and/or folding pole as claimed in claim 1, wherein the second tubular portion has a tapered portion that tapers in a direction toward the securing element and engages in the recess with an end face which adjoins the tapered portion.

10. The telescoping and/or folding pole as claimed in claim 1, further comprising an inner cable connection between the first tubular portion and the second tubular portion that impedes a complete pushing-apart of the first tubular portion and the second tubular portion.

* * * * *